US008250002B2

(12) United States Patent
Kuo et al.

(10) Patent No.: US 8,250,002 B2
(45) Date of Patent: Aug. 21, 2012

(54) METHOD AND SYSTEM FOR POSITIONING (75) Inventors: Sheng-Po Kuo, Taipei (TW); Bing-Jhen Wu, Taipei (TW); Yueh-Feng Lee, Taipei (TW); Yu-Chee Tseng, Hsinchu (TW); Chung-Chou Shen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 876 days.

(21) Appl. No.: 12/104,450

(22) Filed: Apr. 17, 2008

(65) Prior Publication Data

US 2009/0319448 A1 Dec. 24, 2009

(30) Foreign Application Priority Data

Dec. 31, 2007 (TW) .............................. 96151552 A (51) Int. Cl.
*G06F 15/18* (2006.01)
(52) U.S. Cl. ........................................................ 706/12
(58) Field of Classification Search .................. None
See application file for complete search history.

(56) References Cited

U.S. PATENT DOCUMENTS

| 2005/0096068 | A1* | 5/2005 | Bahl et al. | 455/456.1 |
| 2005/0226189 | A1* | 10/2005 | Janneteau et al. | 370/338 |
| 2007/0086382 | A1* | 4/2007 | Narayanan et al. | 370/331 |
| 2007/0099608 | A1* | 5/2007 | Vicharelli et al. | 455/423 |

OTHER PUBLICATIONS

'Visualization design for location aware services': Lin, IEEE, 2006, 1-4244-0100-3, pp. 4380-4385.*
'Location tracking in a wireless sensor network by mobile agents and its data fusion strategies': Tseng, IEEE, 2003, IPSN 2003 LNCS 2634 pp. 625-641.*
'Cluster-enhanced techniques for pattern-matching localization systems': Kuo, Oct. 2007, IEEE, 1-42441455-5.*
'RADAR: An in-building RF-based user location and tracking system': Bahl, 2000, IEEE Infocom vol. 2, pp. 775-784.*
Kuo, et al., "Cluster-Enhanced Techniques for Pattern-Matching Localization Systems", IEEE Int'l Conf. on Mobile Ad-hoc and Sensor Systems (MASS), 2007.
Chia-How Lin et al., "Visualization Design for Location-Aware Services", 2006 IEEE International Conference on Systems, Man, and Cybernetics, Oct. 8-11, 2006, pp. 4380-4385,.
"Office Action of Taiwan Counterpart Application", issued on Sep. 14, 2011, p. 1-p. 6, in which the listed reference was cited.

* cited by examiner

*Primary Examiner* — Kakali Chaki
*Assistant Examiner* — Peter Coughlan
(74) *Attorney, Agent, or Firm* — Jianq Chyun IP Office (57) ABSTRACT

A positioning method includes: first, receiving wireless signals respectively at the positions of a number of training positions so as to extract a number of signal characteristics; next, establishing a positioning database according to the relationship between the training positions and the corresponding positioning module; then, classifying the training positions and the corresponding signal characteristics into a plurality of clusters, wherein when conducting positioning on a positioning node, a characteristic matching is conducted to find out a major cluster most similar to the positioning node; after that, conducting the characteristic matching between the positioning node and the training positions in the major cluster to decide a most-likely position of the positioning node. In addition, the present invention also provides a positioning system using the above-mentioned method.

22 Claims, 5 Drawing Sheets

METHOD AND SYSTEM FOR POSITIONING

CROSS-REFERENCE TO RELATED APPLICATION

This application claims the priority benefit of Taiwan application serial no. 96151552, filed on Dec. 31, 2007. The entirety the above-mentioned patent application is hereby incorporated by reference herein and made a part of specification.

BACKGROUND OF THE INVENTION

1. Field of the Invention

The present invention relates to a method and a system for localization.

2. Description of Related Art

Along with the popularity of wireless mobile equipments day by day, more and more users accomplish the daily life activities through mobile devices. Accordingly, various wireless technologies are drastically boosted, wherein WiFi (wireless fidelity) is counted as the most popular one. With the full development of various wireless technologies, many relevant equipment manufacturers have emphasized on the value-added applications (VAAs) of the wireless environments, one of which is to provide a position sensing service regarding position information. A user can obtain various information and services at the surrounding areas by means of the position sensing service, such as searching for 'the nearest restaurants', 'the closest public traffic means', and so on. In response to the queries from users, the service provider would provide users with the most suitable information in this regard according to their positions.

In the expectable future, the position sensing service is a valued investment for the telecom network service companies, wherein the maturity of the positioning system is the key; namely, how to provide a stable and low cost localization equipment gradually becomes a highly concerned issue. In an outdoor environment, the most used position sensing equipment is a global positioning system (GPS), through which the correct information of a user's position can be conveniently obtained. Here, the accuracy of the information within a range from a couple of meters to tens of meters is determined upon the hardware equipment.

On the other hand, in an indoor environment, no appropriate positioning system used by public is available now. The reason in the regard firstly rests in an inaccuracy arisen from the conventional positioning system, because an indoor space is relatively narrow in comparison with an outdoor environment. The dense indoor environment requires a much higher localization accuracy of the indoor positioning system. Secondly, a feasible positioning system targeting indoor environments requires additional expensive hardware cost. For example, a user in a specific indoor environment needs to be equipped with an additional hardware device, bringing about inconvenience and extra costs. Therefore, there is no effective solution for indoor localization yet. However, there are still some representative indoor localization plans including, for example, 'Active Bat plan' focusing on the position precision or 'RADAR plan' otherwise in consideration of the hardware cost.

The 'RADAR plan' introduces a positioning system based on a pattern-matching algorithm. The system has two phases: training and positioning. In the first phase, a lot of training positions with given coordination are disposed in a building in advance. Then, the signal intensities of the surrounding access points are received and collected at the training positions, so that once a sufficient number of the characteristic samples are collected, all the collected characteristic samples are stored in a database to thereby create a positioning module required by localization. In the second phase, users can identify their positions by inquiring the contents of the positioning module according to the signal intensity information collected in a real-time manner. After comparing the information with use of the positioning module, the most-likely position is stored into a position sensing system, which serves as a position sensing service to be provided to internet application programs.

SUMMARY OF THE INVENTION

Accordingly, the present invention is directed to a positioning method capable of accelerating localization.

The present invention is also directed to a positioning system capable of decreasing the number of comparisons for the characteristic matching.

The present invention provides a positioning method suitable for positioning a plurality of base stations in a region. An exemplary example of the above-mentioned positioning method consistent with the invention includes: first, receiving a plurality of wireless signals sent from the base stations at a plurality of training positions in the multiple-covering cluster-allocating scheme region with a plurality of first signal characteristics. The first signal characteristics are exclusively corresponding to the training positions; next, constructing a positioning database according to the relationship between the training positions and the first signal characteristics; then, creating a plurality of clusters and respectively adding the training positions in the positioning database into one of the clusters; after that, extracting a plurality of representative characteristics from the created clusters. The representative characteristics are exclusively corresponding to the clusters.

The present invention also provides a positioning system suitable for positioning a plurality of base stations in a region. An exemplary example of the above-mentioned positioning system consistent with the invention includes a positioning database, a cluster-allocating module and a cluster management module. The positioning database is adopted for storing a plurality of training positions in the above-mentioned region and a plurality of first signal characteristics, and the first signal characteristics are respectively and exclusively corresponding to the training positions and extracted from the wireless signals sent from the base stations. The cluster-allocating module is coupled to the positioning database for creating a plurality of clusters, wherein the cluster-allocating module respectively allocates the training positions in the positioning database into the clusters and extracts a plurality of representative characteristics, and the representative characteristics are exclusively corresponding to the clusters. The cluster management module is coupled to the cluster-allocating module for managing the clusters allocated by the cluster-allocating module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, exemplary examples of which are illustrated in the accompanying drawings. Wherever possible, the same reference numbers are used in the drawings and the description to refer to the same or like parts.

Figure 1:
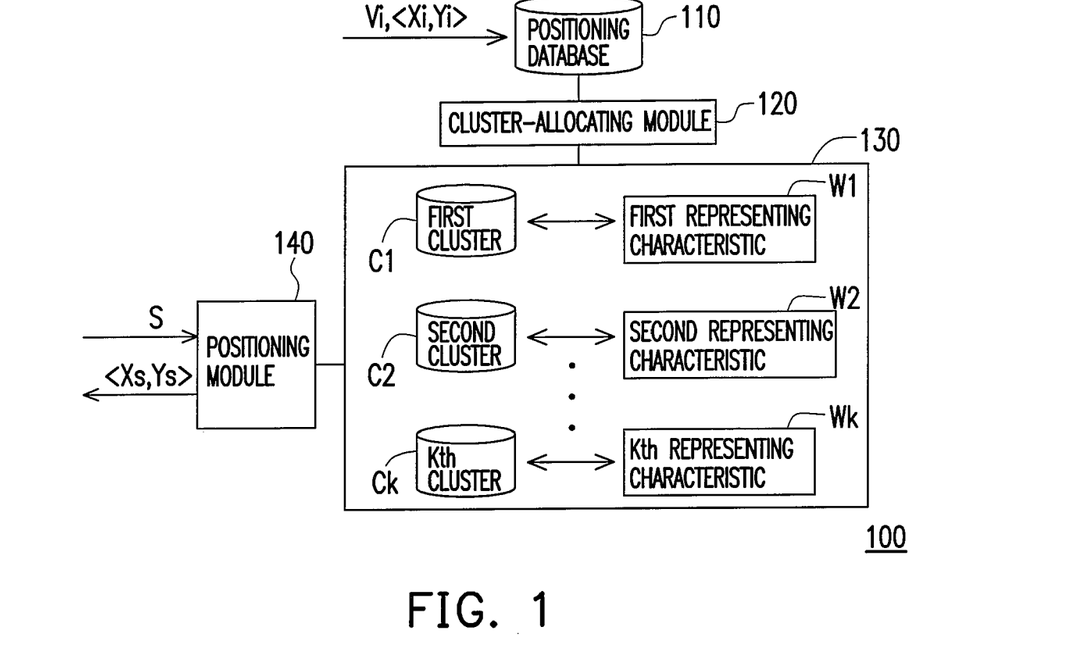
FIG. 1 is a diagram of a positioning system according to an exemplary embodiment consistent of the present invention.

FIG. 1 is a diagram of a positioning system according to an embodiment of the present invention. Referring to FIG. 1, a positioning system 100 provided by the present invention mainly includes a positioning database 110, a cluster-allocating module 120 and a cluster management module 130. The cluster-allocating module 120 is coupled between the positioning database 110 and the cluster management module 130. The positioning database 110 is used for storing the positions of positioning nodes (for example, Ti in FIG. 3 and the positions thereof <Xi, Yi>) and the corresponding first signal characteristic Vi. The cluster-allocating module 120 is for creating a plurality of clusters C1-Ck and respectively allocating the training positions in the positioning database 110 into each of the clusters C1-Ck. The cluster management module 130 is for managing the created clusters C1-Ck, for example, managing the relative correlation between the clusters C1-Ck and the representative characteristics W1-Wk.

Figure 2:
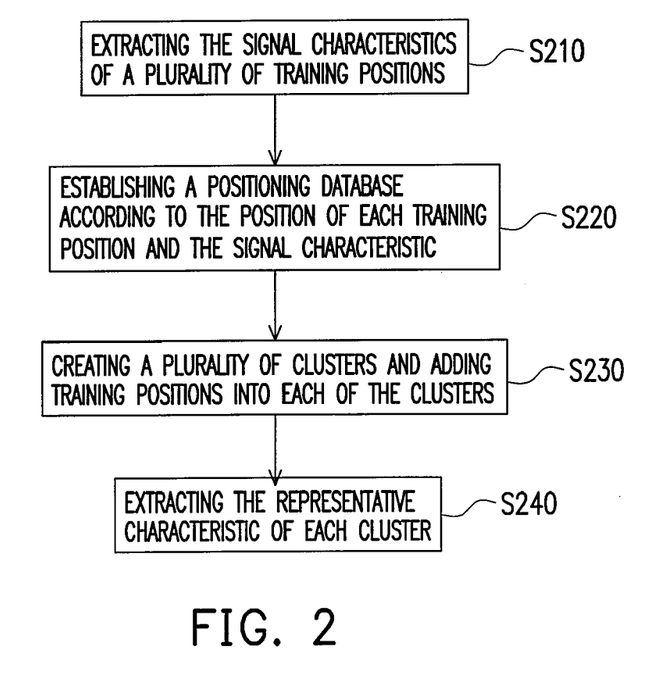
FIG. 2 is a flowchart of a positioning method in a training phase according to an exemplary embodiment consistent of the present invention.
Figure 3:
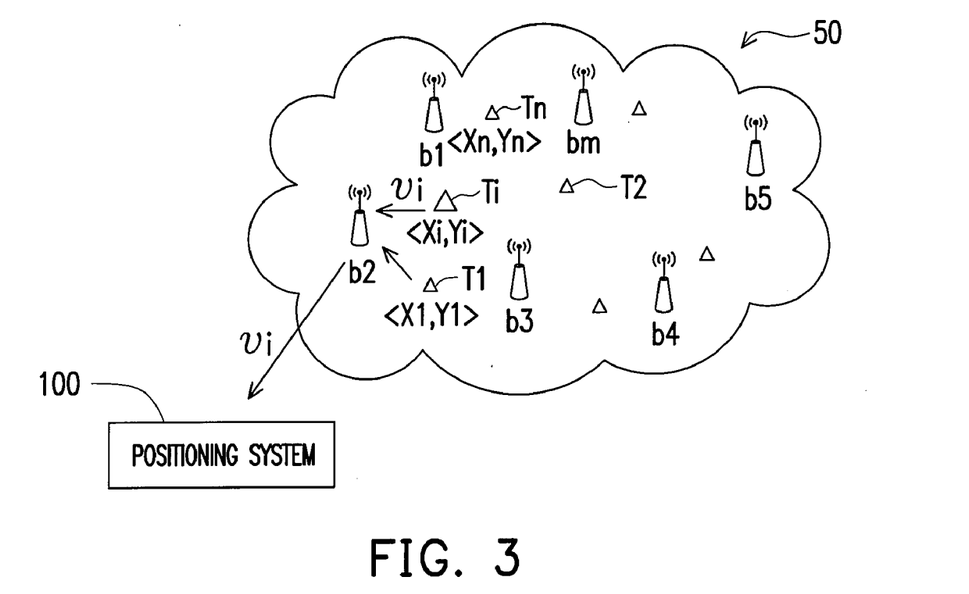
FIG. 3 is a diagram of the positioning system of FIG. 1 in the training phase.

The positioning system 100 further includes a positioning module 140 coupled to the cluster management module 130. The positioning module 140 is for inputting the second signal characteristic S of each positioning node (for example, Ts in FIG. 6) and matching the input second signal characteristic S with the representative characteristics W1-Wk of the clusters C1-Ck so as to find out a major cluster most similar to the positioning node Ts. After matching the second signal characteristic S with the first signal characteristic Vi of each training node Ti in the major cluster, a most-likely position <Xs, Ys> of the positioning node Ts is obtained. The localization process implemented by the positioning system 100 mainly includes a training phase and a positioning phase. The flowchart of a training phase is shown by FIG. 2. FIG. 3 is a diagram of the positioning system of FIG. 1 in the training phase. Referring to FIGS. 3 and 2, a plurality of base stations b1-bm belonging to a wireless network (for example, WiFi) or a telecom network (for example, GSM) are disposed in a region 50. While the positioning system 100 uses the base stations b1-bm to conduct positioning, as described in step S210, the coordinate <Xi, Yi> of a training position Ti (i is a positive integer, for example, i=1~n) and the corresponding signal characteristics Vi are obtained, wherein each of the signal characteristics Vi can be extracted from the received wireless signals of the training position Ti. In the embodiment, the signal characteristic Vi is a signal characteristic vector <Vi1, Vi2, ... Vim> composed of the average signal intensities received respectively by the above-mentioned base stations b1-bm.

The positioning system 100 further conducts step S220, namely, storing the positions <Xi, Yi> of the training Ti and the corresponding signal characteristics Vi into, for example, the positioning database 110 of FIG. 1. In more detail, the positions <Xi, Yi> of the training position Ti and the corresponding signal characteristics Vi are sent by one of the base stations b1-bm (for example, b2) to the positioning system 100, and a receiving unit (not shown) of the positioning system 100 receives the data sent from the base station b2, followed by storing the received data into the positioning database 110. In another embodiment, a table containing the positions <Xi, Yi> of the training position Ti can be established in the positioning database 110, and then, the system collects the signal characteristics Vi in sequence according to the positions <Xi, Yi> of the table and stores the collected signal characteristics Vi into the positioning database 110.

After the positioning system 100 stores the signal characteristics. Vi into the positioning database 110, the process goes to step S230, where the cluster-allocating module 120 creates a plurality of clusters C1-Ck and respectively allocates the training position Ti in the positioning database 110 into each of the clusters C1-Ck. Further, in step S240, the positioning system 100 extracts a plurality of representative characteristics W1-Wk from the above-mentioned clusters C1-Ck.

Figure 4:
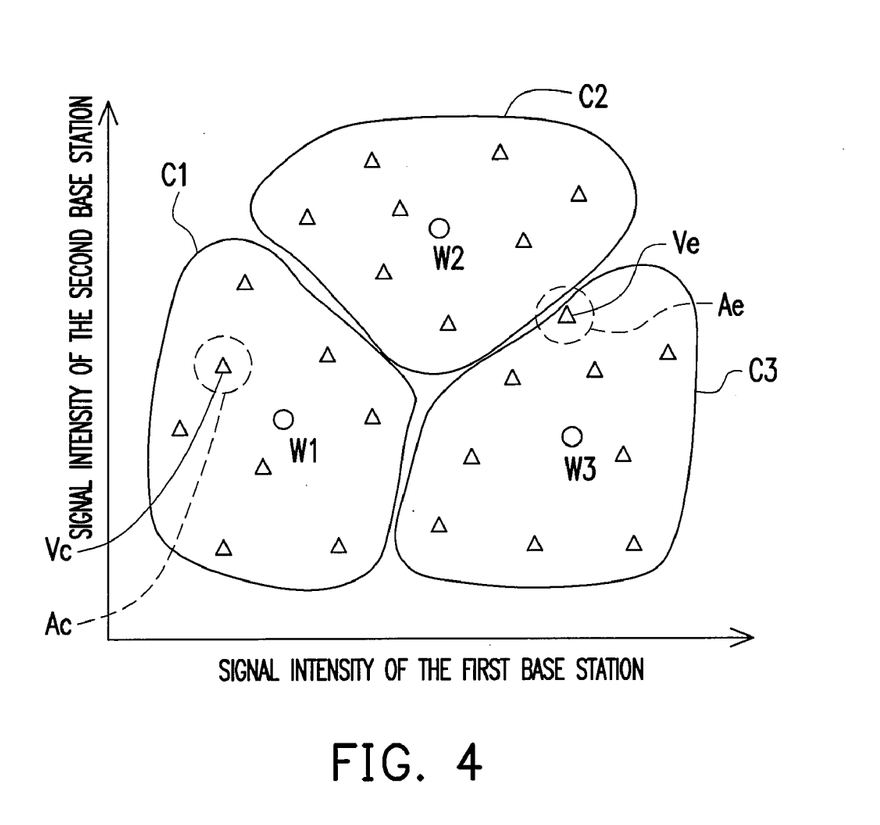
FIG. 4 is a distribution diagram of the clusters of FIG. 1 in a 2-D signal intensity space.

For example, FIG. 4 is a distribution diagram of the clusters of FIG. 1 in a 2-D signal intensity space, wherein abscissa represents the wireless signal intensity sent from a first base station b1 and received by the training position Ti, and ordinate represents the wireless signal intensity sent from a second base station b2 and received by the training position Ti. Referring to FIG. 4, the signal characteristics Vi in the positioning database 110 are classified into several clusters (for example, 3 clusters herein) by using a K-means algorithm, and further the centres of the clusters C1-C3 are taken as three representative characteristics W1-W3.

In more detail, during classifying the clusters by using the K-means algorithm, the positioning database 110 would be classified into K clusters according to the procedure of the conventional K-means algorithm. The steps of performing the K-means algorithm are described as follows. First, K clusters C1-Ck are selected from all the clusters according to the samples of the signal characteristics Vi in the positioning database 110 and taking the centres of the clusters C1-Ck to represent the clusters in the initial phase. Next, the distances between each sample of the rest signal characteristics Vi and the centres are calculated, so that each sample of the signal characteristics Vi would join a cluster centre nearest to the sample. The cluster centres are re-calculated according to the present result of the cluster allocation, wherein the calculation is to average all the samples of the signal characteristics Vi in each cluster. Then, the clusters are allocated again according to the updated cluster centres. The above-mentioned steps are repeated until two continuous results of the allocated clusters are the same, which means the course of classifying the clusters approaches a stable status and thereby the training position Ti contained by all the clusters are outputted.

Figure 5:
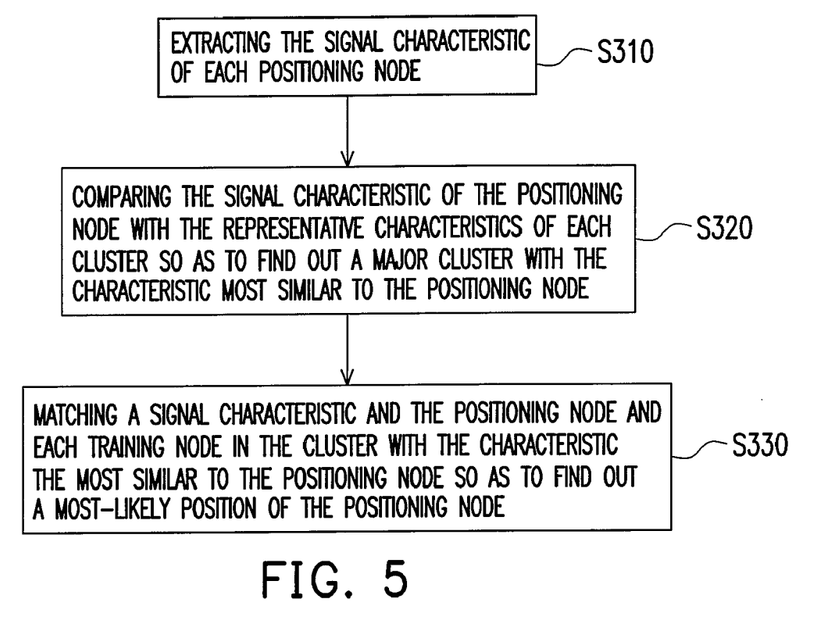
FIG. 5 is a flowchart of a positioning method in a positioning phase according to an exemplary embodiment consistent of the present invention.
Figure 6:
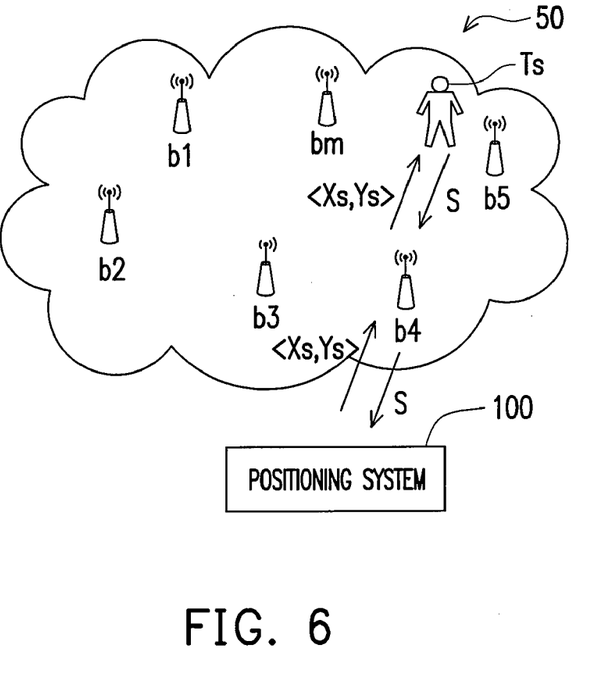
FIG. 6 is a diagram of the positioning system of FIG. 1 in the positioning phase.

After completing the above-mentioned training phase, the method goes to a positioning phase, and the flowchart thereof is shown by FIG. 5. FIG. 6 is a diagram of the positioning system of FIG. 1 in the positioning phase. Referring to FIGS. 5 and 6, when a positioning node Ts (representing a user) enters a region 50 covered by the signals sent by the base stations b1-bm, first in step S310, the wireless signals sent from the base stations b1-bm are received at the position of the positioning node Ts so as to extract a second signal characteristic S. For example, the user at the position of the positioning node Ts can use a portable electronic device (not shown) to receive the wireless signals and calculate the wireless signal intensities sent from each of the base stations b1-bm, so as to obtain the second signal characteristic S. Then, the user uses the portable electronic device to transmit the obtained second signal characteristic S to the positioning system 100 through the base station b4, and a receiving unit (not shown) of the positioning system 100 inputs the second signal characteristic S into the positioning module 140 (FIG. 1).

Next in step S320, the positioning module 140 compares the second signal characteristic S of the positioning node Ts with the representative characteristics W1-W3 of the above-mentioned clusters C1-C3 to find out a major cluster most similar to the positioning node Ts among the clusters C1-C3. Then, in step S330, the second signal characteristic S of the positioning node Ts is matched with the first signal characteristic Vi of each training node Ti in the major cluster to define the most likely position <Xs, Ys> of the positioning node Ts. In this way, the positioning module 140 is able to send the most likely position <Xs, Ys> of the positioning node Ts to the user to complete the positioning phase.

Generally speaking, many wireless access points (WAPs) are installed respectively at every big building or public facilities of a metropolitan to enable every user with a PDA (personal digital assistant) or other mobile devices to connect to the internet. The user is able to use a mobile device to collect the signal intensity of the WAP and return the collected results to a localization server of the rear stage (for example, the positioning system 100), wherein the localization server would decide the most likely cluster first, followed by using a corresponding positioning module 140 to determine the position.

In particular, after the signal characteristics Vi in the positioning database 110 are allocated during the above-mentioned training phase, the positioning can be completed merely by matching the second signal characteristic S with the signal characteristics Vi of the major cluster in the positioning phase. Namely, in the positioning phase, it is not necessary for the positioning system or the positioning method of the present invention to match the second signal characteristic S with all the signal characteristics Vi in the positioning database 110, thus reducing the computation of the matching, saving the matching time and accelerating the localization process. The said advantage of saving time is more significant in the case of a large-scope environment.

Figure 7:
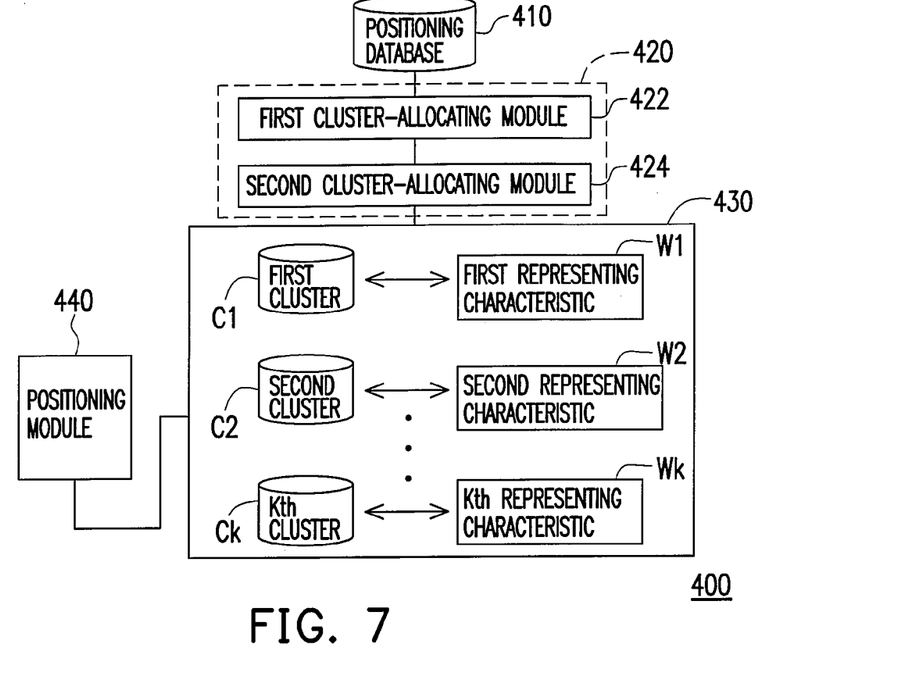
FIG. 7 is a diagram of a positioning system according to another exemplary embodiment consistent of the present invention.

FIG. 7 is a diagram of a positioning system according to another embodiment of the present invention. Referring to FIG. 7, a positioning system 400 is similar to the positioning system 100 in the above-mentioned embodiment except that the cluster-allocating module 420 of the positioning system 400 further includes a first cluster-allocating module 422 and a second cluster-allocating module 424. The first cluster-allocating module 422 is for creating clusters C1-Ck and allocating the training position Ti in the positioning database 410 into one of the clusters C1-Ck respectively and extracting the representative characteristics W1-Wk of the clusters C1-Ck. The second cluster-allocating module 424 is for selectively adding a part of the training position Ti in the positioning database 410 into the above-mentioned clusters C1-Ck (an integer number equal to or greater than 0), such that the clusters C1-Ck are partially overlapped with each other.

In more detail, the first cluster-allocating module 422 uses the K-means algorithm to conduct cluster allocation on the signal characteristics Vi in the positioning database 410. Referring to FIG. 4, it is clear that the clusters C1-C3 allocated by conducting the K-means algorithm are not overlapped with each other. Namely, each of the training position Ti is added into one of the clusters. Therefore, such a scheme may result in additional positioning errors in the localization application. Taking the signal characteristics Vc and Ve in FIG. 4 as an example, the above-mentioned errors bring about an instability of the signal and may change the scopes of the signal characteristics.

Since the signal characteristic Vc may appear in a scope Ac which can be completely covered by the cluster C1, there is no chance to wrongly decide the clusters. However, the signal characteristic Ve may appear in another scope Ae which can be covered by two clusters C2 and C3, and thus there stands a chance of wrongly deciding the clusters. In more detail, after conducting the K-means algorithm, the signal characteristic Ve may be classified into the cluster C3 because the signal characteristic Ve is closer to the centre of the cluster C3. Thus, once the signal of the corresponding signal characteristic Ve is drifted into the scope of the cluster C2, the cluster may be wrongly decided. In other words, in the positioning phase, since the positioning module 440 searches the most likely position <Xs, Ys> of the positioning node Ts only at the training position Ti in the cluster C2, the positioning errors may occur.

In order to further reduce the positioning errors to increase the localization accuracy, it is allowed to slightly overlap the clusters, such that the signal characteristics Vi of at least a part of the training position Ti can be covered by multiple clusters. For example, the signal characteristics Ve are covered by the clusters C2 and C3. In more detail, the positioning system 400 uses the second cluster-allocating module 424 to add a part of the training position Ti into at least a cluster other than the cluster the training node Ti belongs to; namely, the second cluster-allocating module 424 would add Te into C2 or C3. The second cluster-allocating module 424 uses an MNN (multiple-nearest-neighbour) algorithm, a Voronoi algorithm, or a probability-based algorithm to conduct multiple-overlap cluster allocation as described as follows.

In terms of the MNN algorithm, the second cluster-allocating module 424 respectively adds each of the training position Ti in the positioning database 410 into at least one of the clusters C1-Ck other than the cluster the training node Ti belongs to according to the distances between the signal characteristic Vi of each training node Ti and the representative characteristics W1-Wk of all the clusters in the signal intensity space. Based on the result of the K-means algorithm, the cluster having the nearest distance is the major cluster the training node Ti belongs to. In addition, the above-mentioned multiple-overlap cluster allocation is implemented by adding each training node Ti into the nearest $\Phi_{N-1}$ pieces of clusters ($\Phi_{N-1}$ is a positive integer).

Figure 8:
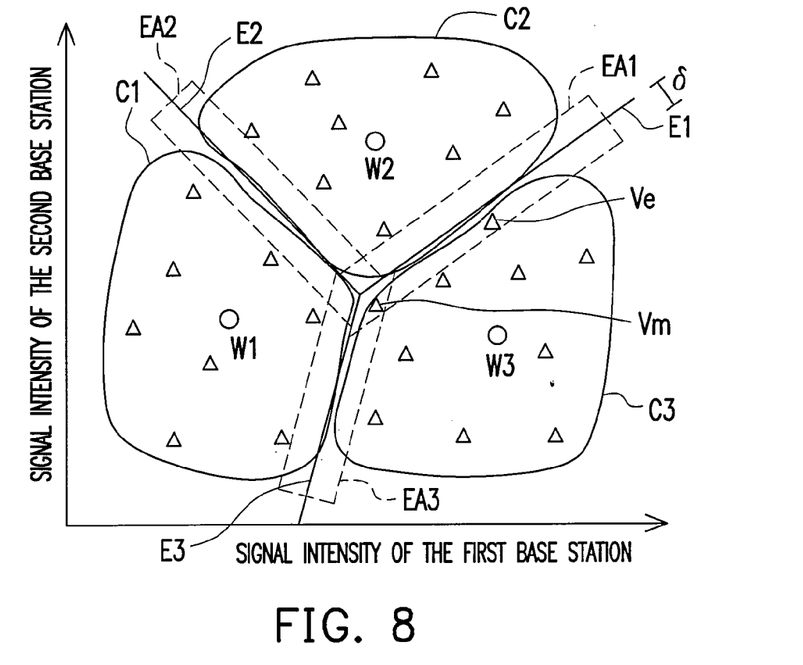
FIG. 8 a mapping diagram between the signal intensity space of FIG. 4 and a Voronoi diagram.

In terms of the Voronoi algorithm, referring to FIG. 8, a unique characteristic of the cluster allocation result after executing the K-means algorithm lies in that the distance between the average signal intensity Vi of all the training position Ti contained by each cluster and the centre of the cluster is less than the distance between the average signal intensity Vi and the centres of other clusters, which is in accordance with the characteristic of a Voronoi diagram and suggests the result obtained from the K-means algorithm can be easily matched with the Voronoi diagram. Accordingly, first, the Voronoi diagram corresponding to the clusters C1-C3 is established so as to obtain a plurality of boundaries E1-E3 of the clusters C1-C3. Next, a plurality of expanded regions EA1-EA3 are formed on the above-mentioned boundaries E1-E3, and the expanded regions EA1-EA3 are exclusively corresponding to the boundaries E1-E3. Then, the training position Ti located at a side of the above-mentioned boundaries E1-E3 and in the above-mentioned expanded regions EA1-EA3 are allocated to the clusters at another side of the boundary.

In more detail, a region with a width along each of the boundaries E1-E3 and symmetrically expanded around the boundary is defined as an expanding region so as to define three expanded regions EA1-EA3. When a training position Te is located in the expanded region EA1, the training node Te is allocated into both of the major cluster C3 and the cluster C2 located at another side of the boundary. When another training node Tm is located in the overlapping region of the expanded regions EA1 and EA3, the training node Tm is allocated into both of the major cluster C3 and the clusters C1 and C2. In conducting the algorithm, the width of the expanded regions EA1-EA3 is set to an extent for multiple coverage. The larger the width $\delta$ is, the higher the possibility for the training node Ti to be multiply covered is. Anyone skilled in the art can properly adjust the width $\delta$ to modify the multiple coverage.

In terms of the probability-based multiple-overlap cluster allocation algorithm, the key thereof is to calculate the probability for the signal sample received at each training node Ti in the positioning phase to be allocated to each of the clusters C1-Ck according to the relationship between the average signal intensity (signal characteristic Vi) at each training node Ti in the training phase and the representative characteristics W1-Wk of the clusters C1-Ck, so that the training position Ti would be sequentially added into the clusters C1-Ck based on the calculated probabilities.

Figure 9:
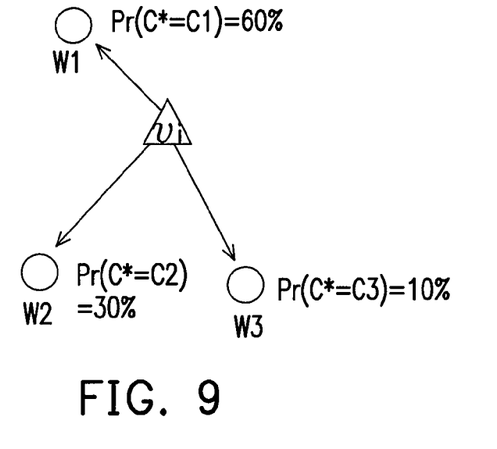
FIG. 9 is a diagram showing the probabilities for a training node to be added into each cluster.

In more detail, FIG. 9 is a diagram showing the probabilities for a training node to be added into each cluster. Referring to FIG. 9, a threshold value $\zeta$ is set, and the training position Ti are sequentially, from the high probability to the low probability thereof, allocated into the clusters until the accumulated probability is higher than the set threshold value $\zeta$ i.e., until the condition $\Sigma_j P_r(C^*=Cj) \geqq \zeta$ is met, wherein j is equal to 1~k and is a positive integer. For example, the calculated probabilities for the training position Ti to be allocated into the clusters C1-C3 are respectively Pr(C*=C1)=60%, Pr(C*=C2)=30%, Pr(C*=C3)=10%, and the threshold value $\zeta$. Is 90%. Since Pr(C*=C1)+Pr(C*=C2)=60%+ 30%=the threshold value $\zeta$, it indicates the training position Ti are sequentially added into the clusters C1 and C2. The major advantage of the scheme rests in that a 'theoretical fault rate of cluster allocation' is surely achieved, and therefore a possible positioning error caused by a cluster-allocating mistake can be effectively estimated or restricted.

Figure 10:
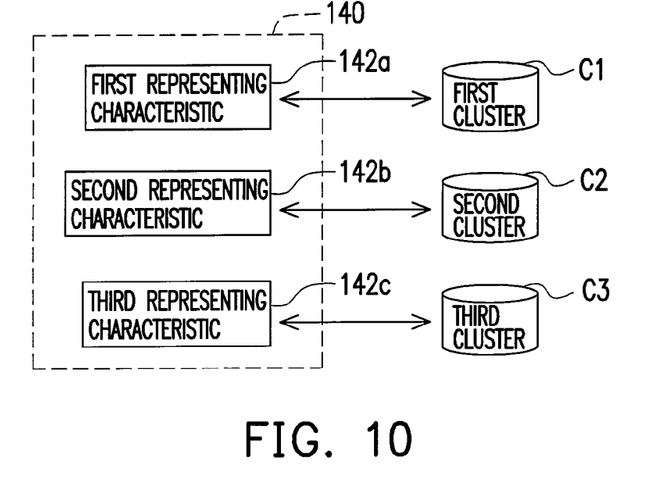
FIG. 10 is a diagram of the positioning module of FIG. 1 according to yet another exemplary embodiment consistent of the present invention.

FIG. 10 is a diagram of the positioning module of FIG. 1 according to yet another embodiment of the present invention. Referring to FIG. 10, in yet another embodiment, the positioning module 140 of FIG. 1 may include a plurality of positioning module units 142a, 142b and 142c, and the positioning module units 142a, 142b and 142c are respectively and exclusively corresponding to the clusters C1-C3. After finding out the major cluster which is most similar to the positioning node Ts, the second signal characteristic S of the positioning node Ts is matched with the first signal characteristic Vi of each of the training position Ti in the major cluster according to the individual characteristic of the clusters C1-C3 so as to find out a most likely position <Xs, Ys.> of the positioning node Ts. For example, the positioning module units 142a, 142b and 142c can use different positioning algorithms respectively according to the different characteristics of the clusters C1-C3. In an alternative, the positioning module units 142a, 142b and 142c can use the same algorithm, but the parameters in the positioning algorithm are allowed to be adjusted upon the different characteristics of the clusters C1-C3. The above-mentioned algorithm is, for example, an NNSS (nearest neighbour in signal strength) algorithm, a probability algorithm, a pseudo neural algorithm, or other sample-matching algorithms.

Figure 11:
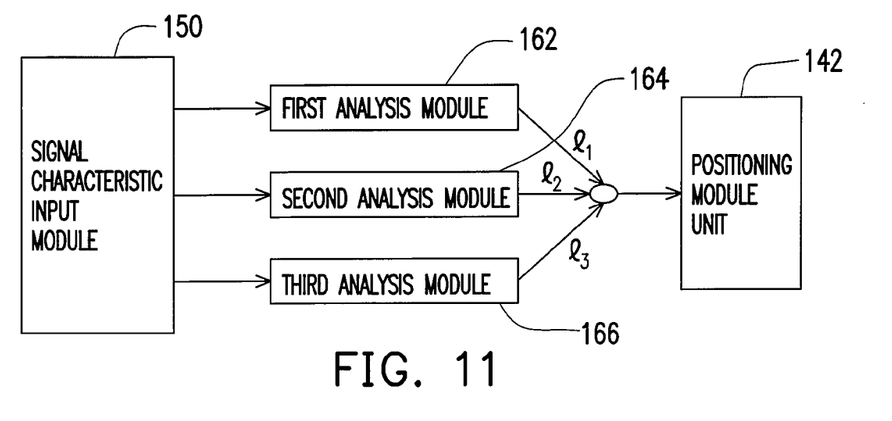
FIG. 11 is a diagram illustrating the heterogeneity algorithm adopted by the positioning module of FIG. 10.

FIG. 11 is a diagram illustrating the heterogeneity algorithm adopted by the positioning module of FIG. 10. Referring to FIG. 11, each of the positioning module units 142a, 142b and 142c can further employ heterogeneity algorithms to match the positioning node Ts with each of the training position Ti in the major cluster so as to produce a plurality of characteristic matching results, followed by conducting weight computation on the produced characteristic matching results to obtain a most-likely position <Xs, Ys> for the positioning node Ts. In more detail, the positioning node Ts and the signal characteristic Vi of each of the training position Ti in the major cluster are simultaneously input into three analysis modules 162, 164 and 166 through a signal characteristic input module 150. The first, second and third analysis modules 162, 164 and 166 respectively use, for example, the NNSS algorithm, the probability algorithm or the pseudo neural algorithm to conduct matching on the signal characteristics so as to respectively produce a characteristic matching result. Further, the weight computation is conducted respectively on each the characteristic matching result respectively with weighted values 11, 12 and 13, followed by outputting the results respectively to the positioning module units 142a, 142b and 142c. The positioning module units 142a, 142b and 142c decide a most likely position <Xs, Ys> of the positioning node Ts according to the weighted results.

It can be seen from the above described, the present invention adjusts or selects different positioning algorithms according to the cluster characteristics so as to enable the positioning system to have higher localization capability and thereby to promote the localization accuracy through the idea of cluster allocation.

In summary, in the method and the system for localization of the present invention, the training positions are allocated into clusters in the training phase, so that the sample amount for matching the characteristics can be reduced in the positioning phase, and thereby the localization process can be accelerated. In particular, in a large-scope environment, the efficacy of saving time based on the present invention is more significant. The method and the system for localization of the present invention can use the multiple-overlap cluster allocation scheme to further promote the localization accuracy. In addition, the method and the system for localization of the present invention can select an appropriate algorithm based on the characteristics of the clusters to conduct the localization process, which not only promotes the localization accuracy, but also increases the compatibility to conduct localizations in different environments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A positioning method, for localization in a region through a plurality of base stations, comprising:
   receiving a plurality of wireless signals sent from the base stations at each training position in the region to extract a plurality of first signal characteristics respectively;
   establishing a positioning database according to the relationship between the training positions and the first signal characteristics;
   creating a plurality of clusters and respectively classifying the training positions in the positioning database into one of the clusters;
   classifying a part of the training positions in the positioning database into at least one of the other clusters which do not contain the classified training position, such that the clusters are partially overlapped with each other; and
   extracting a plurality of representative characteristics from the created clusters.

2. The positioning method according to claim 1, wherein the step of extracting the first signal characteristics comprises:
   calculating the average signal intensity of the wireless signals sent from each of the base stations and received at each training position.

3. The positioning method according to claim 1, wherein the step of creating the clusters comprises:
   conducting cluster allocation on the first signal characteristics in the positioning database based on a cluster-classifying algorithm and taking the centres of the clusters as the representative characteristics.

4. The positioning method according to claim 1, wherein the step of respectively classifying a part of the training positions in the positioning database into at least one of the other clusters which do not contain the classified training position comprises:
   classifying a part of the training positions in the positioning database into at least one of the clusters other than the cluster the classified training position belongs to respectively according to an multiple-nearest-neighbour (MNN) algorithm.

5. The positioning method according to claim 1, wherein the step of respectively classifying a part of the training positions in the positioning database into at least one of the other clusters which do not contain the classified training position comprises:
   establishing a Voronoi diagram corresponding to the clusters so as to obtain a plurality of boundaries of the clusters;
   forming a plurality of expanded regions on the boundaries, wherein the expanded regions are exclusively corresponding to the boundaries; and
   classifying the training positions located at a side of the boundaries and in the expanded regions into the clusters located at another side of the boundaries.

6. The positioning method according to claim 1, wherein the step of respectively classifying a part of the training positions in the positioning database into at least one of the other clusters which do not contain the classified training position comprises:
   calculating the probability for a sample received at each training position to be allocated to each of the clusters respectively based on different first signal characteristics; and
   classifying the part of the training positions into at least one of the clusters sequentially other than the cluster the classified training position belongs to according to said probability.

7. The positioning method according to claim 1, wherein when an object is located in the region, the positioning method further comprises:
   receiving the wireless signals sent from the base stations at any position so as to extract a second signal characteristic;
   matching the second signal characteristic with the representative characteristics so as to find out a major cluster most similar to the received sample from the clusters; and
   matching the second signal characteristic with the first signal characteristics of the training positions in the major cluster so as to decide the most-likely position.

8. The positioning method according to claim 7, wherein the step of matching the second signal characteristic with the first signal characteristics comprises:
   selecting a positioning algorithm according to the characteristic of the major cluster; and
   matching the second signal characteristic and the first signal characteristics according to the positioning algorithm.

9. The positioning method according to claim 8, wherein the positioning algorithm is a nearest neighbour in signal strength (NNSS) algorithm, a probability algorithm, or a neural-network algorithm.

10. The positioning method according to claim 7, wherein the step of matching the second signal characteristic with the first signal characteristics comprises:
    adjusting parameters of a positioning algorithm according to the characteristic of the major cluster; and
    matching the second signal characteristic with the first signal characteristics according to the positioning algorithm after adjusting the parameters thereof.

11. The positioning method according to claim 7, wherein the step of matching the second signal characteristic with the first signal characteristics comprises:
    matching the second signal characteristic with the first signal characteristics by way of a plurality of heterogeneity algorithms to produce a plurality of characteristic matching results and conducting weight computation on the characteristic matching results.

12. The positioning method according to claim 1, wherein the first signal characteristics are exclusively and respectively corresponding to the training positions.

13. The positioning method according to claim 1, wherein the representative characteristics are respectively and exclusively corresponding to the clusters.

14. A positioning system, for localization in a region through a plurality of base stations, comprising:
    a storage unit;
    a positioning database, storing a plurality of training positions in the region and a plurality of first signal characteristics in the storage unit, wherein the first signal characteristics are extracted from the wireless signals sent from the base stations;
    a cluster-allocating module, coupled to the positioning database, wherein the cluster-allocating module comprises:

a first cluster-allocating module for creating the clusters so as to respectively classify the training positions in the positioning database into one of the clusters and extract the representative characteristics; and a second cluster-allocating module for respectively classifying a part of the training positions in the positioning database into at least one of the other clusters which do not contain the classified training position, such that the clusters are partially overlapped with each other; and a cluster management module, coupled to the cluster-allocating module for managing the clusters classified by the cluster-allocating module.

15. The positioning system according to claim 14, wherein each of the first signal characteristics is respectively the average signal intensity of the wireless signals received at each of the training positions.

16. The positioning system according to claim 14, further comprising:

a positioning module coupled to the cluster management module, wherein when an object is located in the region, the positioning module matches a second signal characteristic of the positioning node with the representative characteristics so as to find out a major cluster most similar to the sample received by the object in the clusters and matches the second signal characteristic with the first signal characteristics to decide a most-likely position of the object.

17. The positioning system according to claim 16, wherein the positioning module comprises a plurality of positioning module units, the positioning module units are respectively and exclusively corresponding to the clusters, and the positioning module units use different positioning algorithms based on the characteristic of the corresponding cluster to match the second signal characteristic with the first signal characteristics and to further decide a most-likely position of the object.

18. The positioning system according to claim 17, wherein the positioning algorithm is a nearest neighbour in signal strength (NNSS) algorithm, a probability algorithm, or a neural-network algorithm.

19. The positioning system according to claim 16, wherein the positioning module comprises a plurality of positioning module units, the positioning module units are respectively and exclusively corresponding to the clusters, and the positioning module units use a homogeneous positioning algorithm but with adjusted parameters respectively based on the characteristic of the corresponding cluster to match the second signal characteristic with the first signal characteristics and to further decide a most-likely position of the positioning node.

20. The positioning system according to claim 16, wherein the positioning module comprises a plurality of positioning module units, the positioning module units are respectively and exclusively corresponding to the clusters, the positioning module units use a plurality of heterogeneity algorithms to match the second signal characteristic with the first signal characteristics so as to produce a plurality of characteristic matching results, and the positioning module units respectively conduct weight computation on the characteristic matching results so as to decide a most-likely position of the positioning node.

21. The positioning system according to claim 14, wherein the first signal characteristics are exclusively and respectively corresponding to the training positions.

22. The positioning system according to claim 14, wherein the representative characteristics are exclusively and respectively corresponding to the clusters.

* * * * *